Jan. 16, 1940.  R. E. FLANDERS  2,187,228
WHEEL TRUING MECHANISM
Filed Jan. 29, 1937  6 Sheets-Sheet 1

Inventor
Ralph E. Flanders
by Wright, Brown, Quinby & May
Attys.

Jan. 16, 1940.                R. E. FLANDERS                 2,187,228
                           WHEEL TRUING MECHANISM
                            Filed Jan. 29, 1937          6 Sheets-Sheet 6

Inventor
Ralph E. Flanders
by Wright Brown Quinby Alley
Attys.

Patented Jan. 16, 1940

2,187,228

UNITED STATES PATENT OFFICE 2,187,228

WHEEL TRUING MECHANISM

Ralph E. Flanders, Springfield, Vt., assignor to Jones & Lamson Machine Company, Springfield, Vt., a corporation of Vermont Application January 29, 1937, Serial No. 122,971

17 Claims. (Cl. 125—11)

This invention relates to mechanism for truing grinding wheels, and has for a particular object to provide a simple mounting and actuating means applicable to a plurality of truing tools by which high accuracy of wheel contour may be produced and maintained, and by which contours which may differ widely from each other may be produced by effecting minor changes and substitutions in the mechanism.

A further object is to provide for truing traverses in a manner which will maintain a true wheel contour regardless of the helical angle of the wheel and without danger of chipping the wheel edge.

To these ends each truing tool is carried by a rock arm so arranged that as the arm is rocked, the tool is caused to traverse a wheel face, and the position of the arm lengthwise of the rocking axis is controlled to determine the contour of the face being traversed. In order to avoid danger of chipping of the wheel edges, the tool may be arranged to true only on that stroke in which the contacts are first made with the wheel edges and progress away from these edges.

This application is a continuation in part of my application Serial Number 46,756 filed October 25, 1935, for Grinding machine.

For a more complete understanding of this invention, reference may be had to the accompanying drawings in which:

Figure 2 is a vertical section on line 2—2 of Figure 1.

Figure 9 is a diagrammatic showing of the normal idle positions of three truing devices with relation to the wheel edge for truing to United States standard thread contour.

Figures 10, 11, and 12 are views somewhat similar to Figures 1, 2 and 5, respectively, but arranged for truing the wheel to grind buttress threads.

Figure 14 is a view similar to Figure 9, but showing four truing devices arranged for truing the wheel for buttress threads, and where the wheel operates close to a shoulder on the work.

Wheel truing mechanism, United States standard threads

Referring first to the construction shown in Figures 1 to 5, the mechanism therein illustrated is designed to true the wheel to the shape for grinding United States standard threads.

The mechanism as shown is housed within a casing 50, the forward end of which is formed cylindrical, as at 51, and projects toward the grinding wheel 1 and is suitably mounted on the wheel slide (not shown) with capacity for axial movement thereon from and toward the wheel. As this mounting and moving mechanism forms no part of the present invention, it is not herein illustrated.

Figures 1, 3, 4, 5, 6, 7, 8:
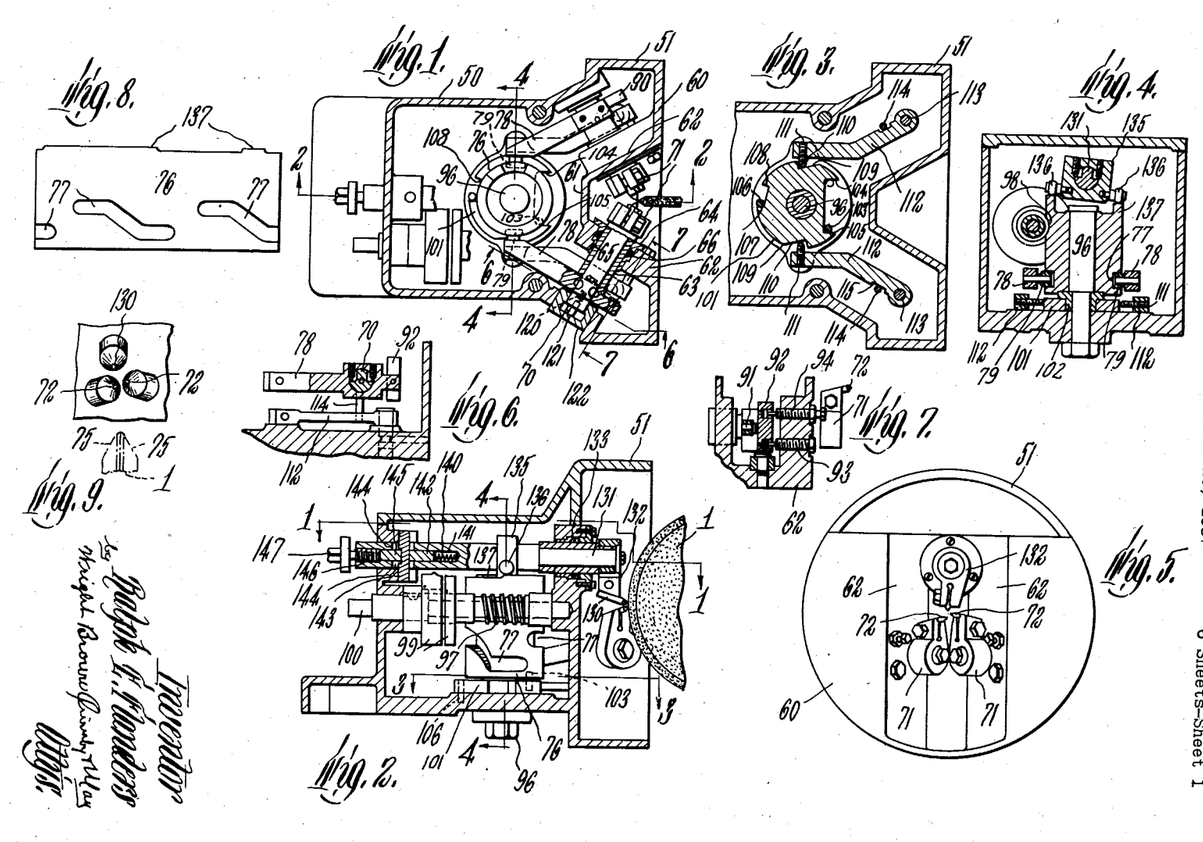
Figure 1 is a horizontal section through a truing mechanism embodying the invention, on line 1—1 of Figure 2.
Figure 3 is a detail section on line 3—3 of Figure 2.
Figure 4 is a section on line 4—4 of Figures 1 and 2.
Figure 5 is an end elevation of the mechanism showing the truing tools.
Figures 6 and 7 are detail sections on line 6—6 and 7—7, respectively, of Figure 1.
Figure 8 is a development of the traverse cam.

As shown best in Figures 1 and 2, the casing 51 is provided with a forward wall portion 60 having a reentrant central portion at 61 and inclined side wall portions 62. Through these wall portions 62 are arranged bearing sleeves 63, which are arranged between packing rings 64 and 65 enclosing between them packing 66 to prevent the passage of metal particles, abrading material, and coolant through these wall members and into contact with the mechanism housed within the casing 51. Journaled in each of the sleeves 63 is a shaft 70, which has clamped thereto an arm 71 carrying a diamond truing tool 72 at its end, eccentric to its shaft 70. By maintaining the casing 50 full of oil, the seepage of this oil out around the shafts 70 acts as a further aid in preventing the entry of grit and other foreign matter into this casing. The two shafts 70 are arranged at angles of 120° to each other so that the two diamonds 72, when the corresponding shaft 70 is rocked, are caused to traverse the inclined side faces 75 of the grinding wheel 1. These inclined side faces of the grinding wheel define the shape of the threads and the valleys between them in the work being ground. One of these diamonds 72 is positioned slightly above the other, as shown in Figure 9. They are rocked to effect such traverse of the wheel faces by a cam drum 76, which has a pair of cam grooves 77 therein, each of these grooves cooperating with followers 79 on the ends of bars 78. The forward ends of these bars are clamped to the shafts 70 so that as the rear ends of the arms 78 are moved up and down by engagement of their cam followers in the grooves 77, these shafts 70 are rocked.

In order to provide for extreme accuracy in setting, means are provided for slightly varying the angles of traverse of the diamonds across the wheel face. To this end, means are provided by which, beside the rocking motions of the shafts 70 produced by the rocking action of the bars 78, they may be given a slight axial motion simultaneously therewith. As shown this is done by prolonging the bars 78 forwardly of the shafts 70 and providing on the prolonged end of each, as at 90, a cam follower 91, which rides on a cam plate 92. This cam plate 92 is adjustably supported at either end (see Figure 7) on the adjusting screws 93 and 94 threaded through the inclined casing wall 62. By adjusting the plate 92 angularly, the forward end of the corresponding lever arm 78 may be given a motion axially of the corresponding shaft 70, moving the shaft therewith, thus to effect an axial movement of the shaft at the same time that it is rocked. The amount of this axial movement depends on the relative adjustment of the two screws 93 and 94, and it may be made in opposite directions for the same direction of rocking of the corresponding shaft 70, by tilting the plate 92 in one or the other direction from parallelism with the wall member 62. By this means a very accurate control of the inclined wall contour of the grinding wheel is made possible. The cam drum 76 is journaled on a vertical shaft 96, and is arranged to be rocked in opposite directions by the rotation in opposite directions of a worm 97 engaging worm teeth 98 in a portion of the periphery of the cam 76. This worm 97 is driven through friction plates, shown generally at 99, from a shaft 100, this friction drive being interposed in order that there may be a full traverse of the diamond points, but without danger of overthrow, the shaft 100 being rotated through a sufficient angular distance to insure the rocking of the diamond points throughout their entire permissible amplitude, any further turning of the shaft 100 being taken up in slippage in the frictional connection.

It is also desirable that the diamonds be moved in contact with the grinding wheel only in a direction away from the apex of the wheel and thus inwardly from the wheel periphery, as if it be attempted to true in the opposite direction, there is danger of chipping the wheel edge. To this end provision is made for relieving the diamonds from the wheel during their rocking motion back toward the apex of the wheel. This is accomplished by a rocking cam plate 101, which is journaled on a bushing 102 on the cam shaft 96. A pin 103 projects downwardly from the cam 76 between a pair of shoulders 104 and 105 (see Figures 1, 2 and 3) in the cam plate 101. A second pin 106 secured in the base of the housing 50 projects between a pair of shoulders 107 and 108 on the cam plate 101. This cam plate also has oppositely disposed notches 109 having long inclined faces 110 against which ride abutment screws 111 carried at the rear ends of a pair of arms 112, the forward ends of which are fulcrumed as at 113 on the base of the casing 50. Projecting down from each of the arms 78 is a pin 114 which engages in a notch 115 in the arm 112 beneath it. During the rocking movement of the cam 76 in a direction to traverse the diamonds from the point rearwardly across the faces of the grinding wheel, the pin 103 rides from the position shown in Figure 3 in full lines to the dotted line position, whereupon further turning of the cam 76 causes a rocking of the cam plate 101 in a direction to cause the inclined faces 110 to ride out against the abutments 111, thus to swing the rear ends of the arms 112 outwardly, which, acting through the pins 114, causes the rock shafts 70 to be moved axially in a direction to retract the diamond points from their normal truing positions. The arms 112 remain in this position during the reverse rocking motion of the cam 76 until the pin 103 engages the shoulder 105 and starts to turn the cam plate 101 in the reverse direction to the position shown in Figure 3, whereupon a spring 120 (Figure 1) seated in a socket in the rear end of each of the shafts 70 and bearing on a pin 121 projecting into this socket from the base of the cup-shaped member 122 carried by the casing 50, and in which the rear end of each of the shafts 70 rides, returns the shafts 70 to their normal operative positions, and returns the abutments 111 into the notches 109 in the position shown in Figure 3. The shoulders 107 and 108 act with the pin 106 as stops to limit the extent of rocking motion of the cam plate 101.

Beside the two diamonds 72 which true the inclined faces of the wheel, a third diamond 130 is shown to true off the apex of the wheel in order to conform to United States standard threads. This diamond is shown as positioned slightly above the horizontal plane of the grinding wheel shaft 101 (Figures 2 and 9) and it is carried by a rock shaft 131 (see Figure 2), being mounted in a holder 132 similar to the holders for the side face truing diamonds 72. The shaft 131 is mounted in a packed bearing 133 and back of this bearing it has clamped thereon, a collar 135 having a pair of cam rollers 136 journaled on studs projecting therefrom. These cam rollers ride on a peripheral cam ridge 137 on the upper face of the cam 76 (Figures 2 and 4), so that as the cam 76 is rocked, the shaft 131 is rocked to cause the diamond 130 to pass across the apex of the wheel. This rock shaft 131 is pressed forwardly toward the wheel 1, as by a spring 140 seated in a socket 141, and reacting against a plug 142 which bears at its outer end against a key pin 143 extending through oppositely disposed slots 144 of the rock shaft 131. Against the opposite face of this key pin 143, is a second plug 145 against which may bear the threaded extremity 146 of a micrometer adjusting screw 147. The spring 140 holds the inner end of the screw 147 against the pin 143, and by adjusting the screw 147, the limit of inward axial position of the shaft 131 may be adjusted to determine the amount of the apex of the wheel which will be removed by the diamond 130. In operation the truing mechanism as a whole is first moved toward the wheel edge into truing position. Then the shaft 100 is caused to turn first in one direction and then in the other sufficiently to rock the cam drum 76 in one direction and then in the other between its limits of motion, any excess in the rotation of the shaft 100 being taken up in the slippage of the slip drive 99. Rocking of the cam drum in the first direction rocks the side truing devices backwardly from the apex of the grinding wheel across its inclined side faces and the end truing device 130 across the apex of the wheel between these side faces. As the cam drum is about to reach its rocking limit in this direction, it rocks the cam plate 101 which retracts the side truing devices through axial motions of their carrying rock shafts so that during the reverse motion of the cam drum they are returned to their initial position out of contact with the wheel, the last portion of this motion being again effective on the cam plate 101 to return the side truing devices to their operative positions axially of their rock shafts. The cam drum then stops with the parts again in position for the start of the truing cycle.

A modified construction of a truing mechanism designed to United States standard thread contour is illustrated in Figures 15 to 19. In these figures the truing mechanism is contained within a cylindrical casing 150 which carries a motor 151 by which the truing mechanism is actuated. This motor 151 drives, through a coupling 152, a shaft 153 journaled in spaced partition members 154 and 155. Between these partition members the shaft 153 carries a worm 156 which meshes with a worm wheel 157 on a transverse shaft 158. This shaft, in turn, carries a worm 159 which meshes with a worm wheel 160 on a cam shaft 161. The forward end portion of this cam shaft carries an actuating cam 162 having a cam groove 163 therein. In this cam groove rides a cam follower roll 164 carried by an arm 165 which is secured to a rock shaft 166. Also secured to this rock shaft is a second shorter arm 167. The arm 165 has a bifurcated portion 168, the forks of which ride in notched side portions 170 of a circular rack bar 171, so that as the arm 165 is rocked this rack bar 171 is given an axial motion. The arm 167 is likewise provided with a bifurcated portion which rides in similar recesses in the sides of a rack bar 175. These rack bars are mounted in suitable frame portions of the casing 150, and, as shown, are parallel to each other and to the axis of the casing. The teeth on these rack bars are arranged at an angle to the perpendicular to their respective longitudinal axes and in a direction to engage with the teeth of segmental pieces as 176 (see Figure 19) secured to the rock shafts 177 which are arranged at angles of 120° to each other, and carry at their outer ends outside of the casing 150, the side truing tools, such as 180, which may be constructed and mounted similarly to the corresponding parts shown in Figures 1 to 9.

Figures 15, 18, 19:
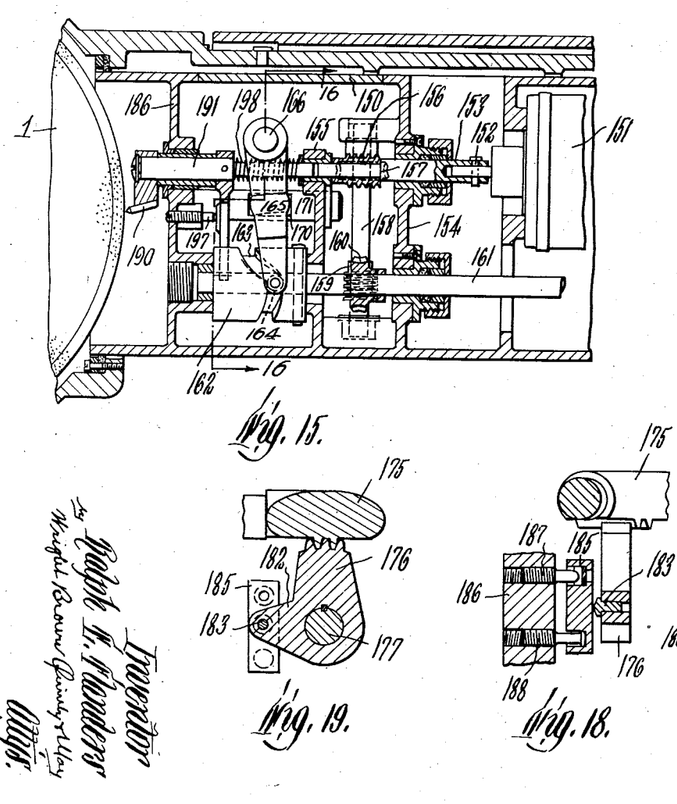
Figure 15 is a vertical cross section somewhat similar to Figure 1, but showing a modified construction.
Figures 18 and 19 are detail sections on lines 18—18 and 19—19, respectively, of Figure 17.
Figure 17:
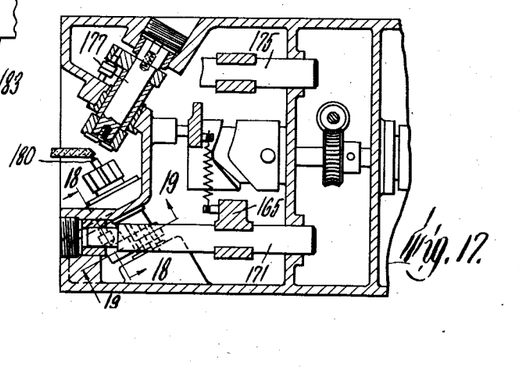
Figure 17 is a section on line 17—17 of Figure 16.

The axial positions of these rock shafts 177 may be controlled by cam means somewhat similar to that shown in Figure 7 and illustrated more particularly in Figures 17 and 19. Referring to these Figures, it will be noted that each segment 176 has a lateral extension 182 carrying a follower 183, whica, as the corresponding shaft 177 is rocked, moves along and in contact with a cam plate 185. This cam plate may be angularly adjusted with reference to a cross frame member 186 of the casing 150, as by means of the individually adjustable threaded plugs 187 and 188 which bear in recesses in the cam plate 185. The cam 162, therefore, controls the motion of both of the side truing diamonds which are moved simultaneously backward and forwards.

The third truing device shown at 190 which trues off the apex of the grinding wheel 1 is shown as carried by a rock shaft 191 to which is secured an actuating arm 192. This arm has its end portion 193 positioned to be actuated by a peripheral cam portion of the cam 162, this cam 162 having a flattened portion 194 (see Figure 16) which permits the arm 192 to be rocked inwardly by the action of a spring 195 and then forces the arm 192 outwardly to produce a double stroke of the dressing diamond 190 during one portion of the rotation of the cam 162.

The axial position of the shaft 191 may be cam-controlled as are the axial positions of the rock shafts 177, and for this purpose it is shown as provided with a bearing boss 196 which rides against an adjustable screw abutment 197 (see Figure 15). The portion 196 is held against this abutment as by means of a coil spring 198 which surrounds a reduced diameter extension portion of the shaft 191, the extreme end of which is journaled in the partition member 155 and is shown in alinement with the shaft 153.

Figure 16:
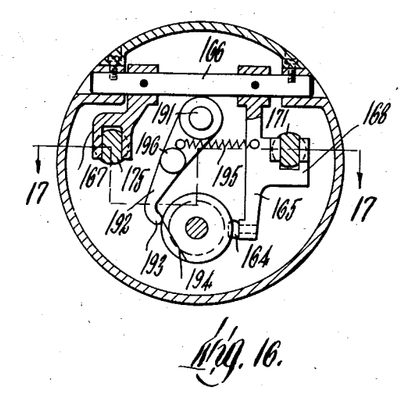
Figure 16 is a section on line 16—16 of Figure 15.

No provision is made in this construction for the retraction of the individual tools by axial motion of their respective rock shafts on the return traverse of the side truing tool, but the same result may be accomplished by effecting a retraction of the entire mechanism during the return traverse of the side truing devices so that truing is effected only during their direction of motion backwardly from the apex of the wheel. It will be noted that the cam 162 is so designed that on a single complete revolution, it effects both the active traverse and the idle traverse, the arm 165 being returned quickly by a relatively steep portion of the cam path 163. As shown in my application Serial No. 94,903, filed August 8, 1936, for Grinding machine, the rotation of the shaft 161 (120 in the application) produces a retraction of the entire mechanism throughout that portion of its rotation during which the side grinding tools are being returned to their inward positions adjacent to the apex of the grinding wheel. The traverse and return of the top truing diamond 190, it will be noted from an inspection of Figure 16, is produced only during a short portion of the rotation of the cam 162, and this is all done while the mechanism is in truing position, the top truing device being idle during the time the mechanism is retracted from truing position. The particular manner in which this retraction of the entire mechanism is produced, per se, forms no part of the present invention and has therefore not been shown herein.

*Wheel truing mechanism for buttress threads*

In Figures 10 to 14 is shown a modification of the truing mechanism of the general type of Figures 1 to 9 intended for grinding buttress threads and where the threads extend so close to a shoulder on the work that one face of the grinding wheel must be trued off to permit the grinding wheel to work up sufficiently close to the shoulder. The side face dressing diamonds with this mechanism are arranged in the angular relationship shown in Figure 10. Other than this changed angular relationship, the mounting and actuation of the side diamonds from the rocking cam are the same as that for the United States standard threads as previously described in connection with Figures 1 to 9.

The rock shaft 131a, which carries the apex truing diamond 130a, has secured thereto a cam arm 200 having a roller 201 riding on the top of the cam 76a, which is provided with a cam indentation 760 into and out of which the cam follower 201 rides in order to impart the desired rocking motion to the shaft 131a when the cam 76a is rocked. The shaft 131a otherwise may be mounted similarly to the shaft 131 shown in Figure 2.

Figure 10:
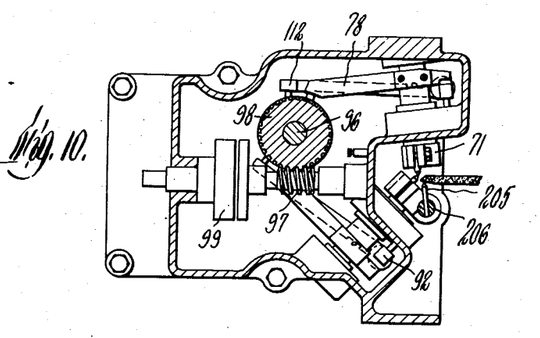
Figures 12, 14:
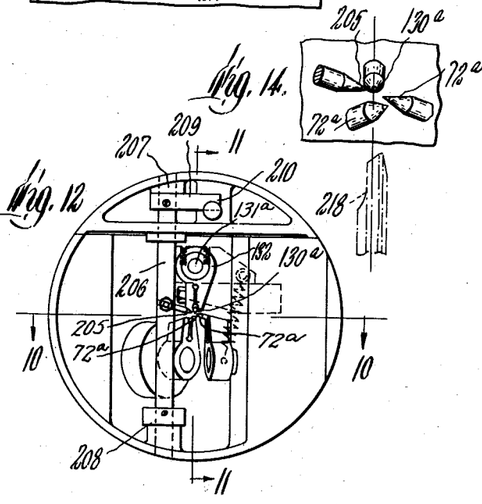
Figure 13:
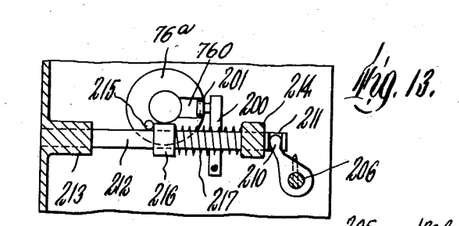
Figure 13 is a detail section on line 13—13 of Figure 11 showing the control for the top truing device.

A fourth diamond 205 for dressing out one side of the grinding wheel is employed in this construction. This diamond 205 is carried by a vertical rock shaft 206 (Figures 10, 12 and 13). This rock shaft 206 is suitably journaled in upper and lower spaced bearings 207 and 208 and just beneath the bearing 207, this shaft 206 has fixed thereto an arm 209, which has a head 210 (see Figure 13) riding in a slot 211 in the end of a horizontal bar 212 which is slidable axially in a pair of bearings 213 and 214. The top of the rocking actuating cam 76a is provided with an upwardly extending pin 215, which engages a collar 216 on the bar 212 and this collar 216 is held in contact with the pin 215 by the coil spring 217 surrounding the bar 212 and bearing at one end against the bearing 214 and at the other against the collar 216. Rocking of the cam 76a thus moves the bar 212 axially and rocks the shaft 206 and the diamond 205.

The fourth truing diamond in its motion hollows out the side face of the grinding wheel as at 218 substantially parallel to the plane of maximum wheel diameter (shown in Figure 14), so that the grinding wheel is enabled to work up to threads close to a shoulder on the work.

*Wheel truing mechanism for special shapes of threads*

In the mechanisms previously described, the axial motion of the rock shafts which carry the side truing tools has been controlled for the purpose of correcting for slight inaccuracies of wheel contour which might otherwise be produced, but it is quite possible to employ this axial motion of the rock shafts more extensively in order to provide for various wheel contours of special or unusual shapes. Mechanism in which this capability is utilized is shown in Figures 20 to 27 and various spaced wheel contours and resulting contours of work are illustrated in Figures 28 to 32, inclusive.

The mechanism shown in Figures 20 to 27 is of the general type illustrated in Figures 15 to 19 wherein the idle traverse of the side truing tools is produced by the retraction of the entire truing mechanism, motions of the truing tools being produced by the rotation rather than by the rocking of an actuating cam and the mechanism being retracted and there held during one portion of the angular motion of the actuating cam while the tools are being retracted toward the wheel apex.

Figures 24, 26:
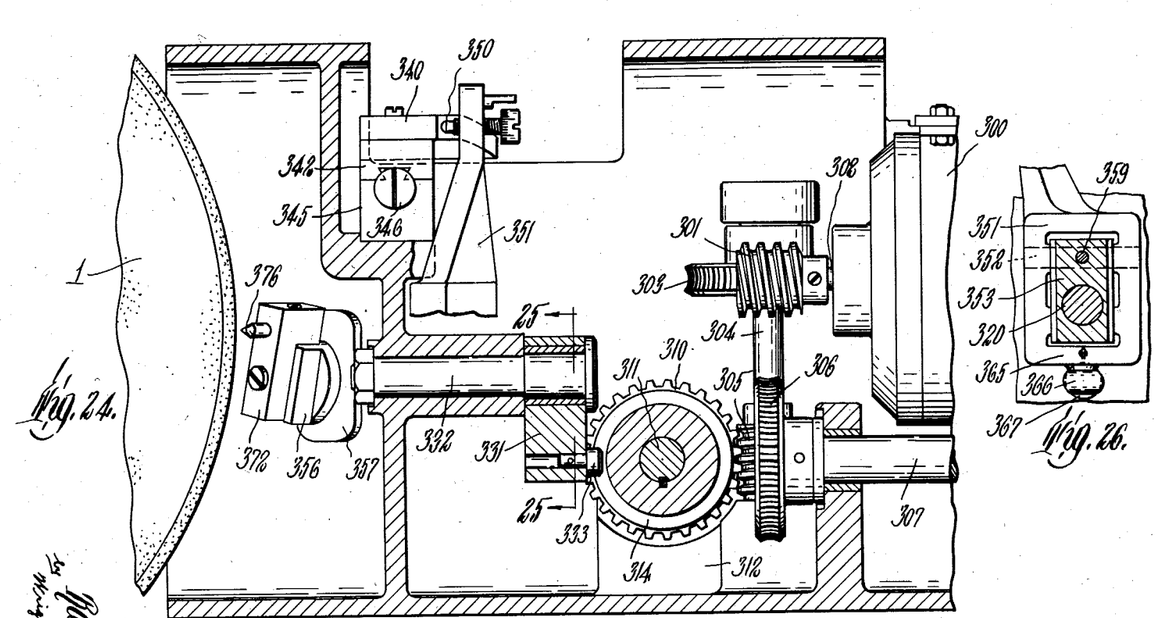
Figure 24 is a fragmentary section through the mechanism on line 24—24 of Figure 20.
Figure 26 is a detail section on line 26—26 of Figure 21.
Figure 25:
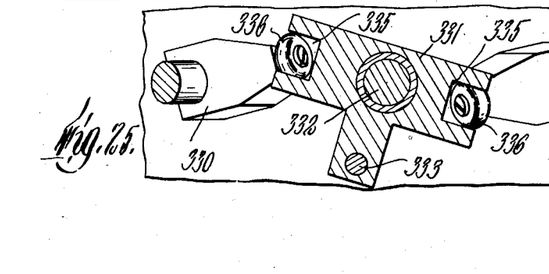
Figure 25 is a detail section on line 25—25 of Figure 24.

At 300 in Figure 24 is shown the motor for actuating the truing tools, this motor being connected through a reduction gear mechanism comprising a worm 301 on the motor shaft 302, a worm wheel 303 on a transverse shaft 304, and a worm 305 on this transverse shaft meshing with a worm wheel 306 on a shaft 307. This shaft 307 extends rearwardly in the casing and controls the retracting mechanism as previously mentioned and as shown in my patent application Serial No. 94,903, heretofore mentioned. The shaft 304, also, drives, through the same worm 305, a worm wheel 310 of the same size as the worm wheel 306, but secured to a cam shaft 311 positioned substantially at right angles to the shaft 307. This shaft 311 which is journaled in the bearing posts 312 and 313 carries the cam 314 which actuates the side truing devices, no apex truing device being employed in this mechanism, the side truing devices controlling the complete contour of the grinding face of the wheel being trued. The truing devices are carried by the angularly related rock shafts 320 which may be pressed forwardly, as by the springs 322 seated in recesses in their rear ends and reacting against abutment plugs 324, substantially as illustrated in the previously described truing mechanisms.

To each of these rock shafts 320 is secured an arm 330, both of which are rocked by an actuating mechanism, the connections being such as to permit axial motion of the rock shafts 320 as they are being rocked. This actuating mechanism comprises a somewhat T-shaped rock member 331 journaled on a stub shaft 332 and having at the extremity of the central arm a cam follower 333 which rides in a cam groove 334 in the cam 314, so that as the cam 314 is rotated the rocker 331 is rocked from side to side. The other arms of the rocker 331, and the arms 330 secured to the truing device rock shafts, are provided with groove 335 and rollers 336 riding in these grooves so that the rocking of the rocker 331 will rock the arms 330 and yet will permit them to be moved axially. As shown the rollers 336 are carried by the arms 330, and the grooves 335 are formed in the rocker 331, these grooves being arranged angularly to the rock axis of this rocking member and substantially parallel to the axes of the rock shafts 320.

Figures 20, 21, 22, 23:
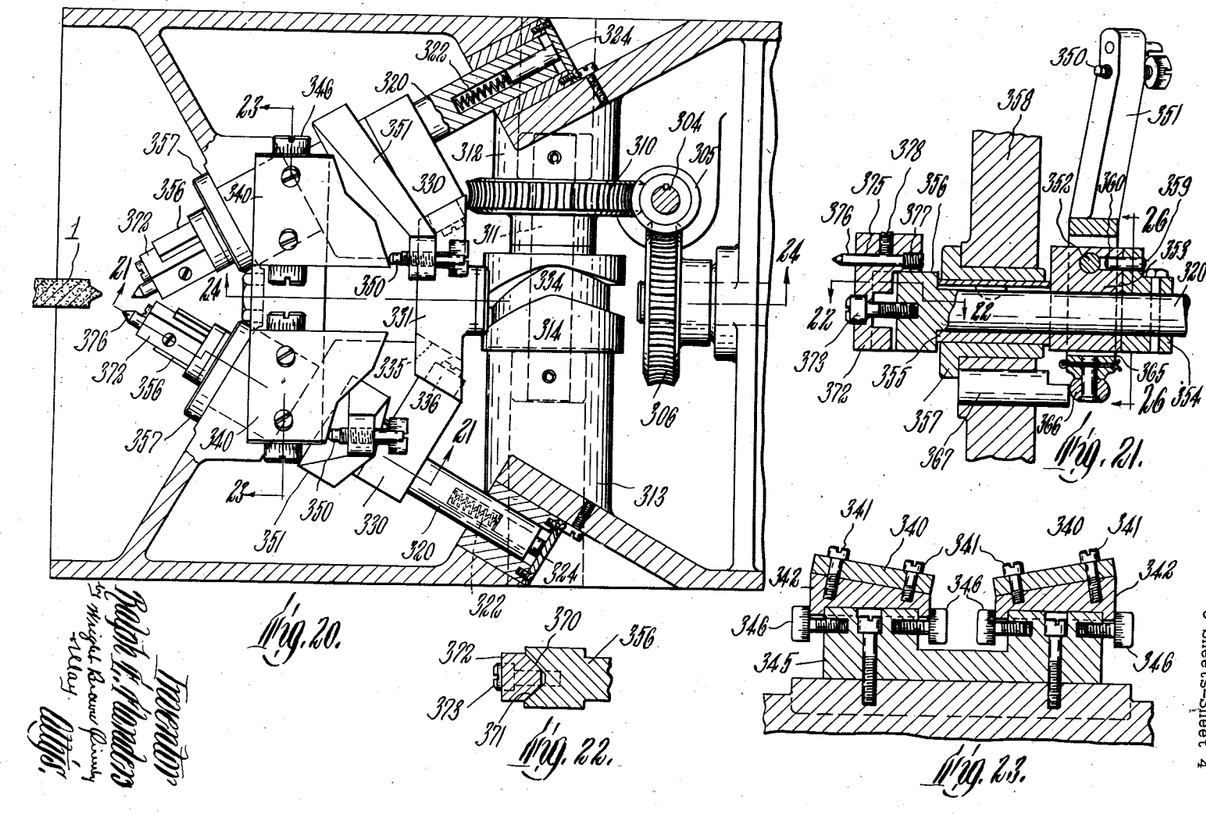
Figure 20 is a view somewhat similar to Figure 15, but showing a further modification particularly designed to true a wheel to a special contour.
Figure 21 is a detail section on line 21—21 of Figure 20.
Figure 22 is a detail section on line 22—22 of Figure 21.
Figure 23 is a detail section on line 23—23 of Figure 20.
Figure 27:
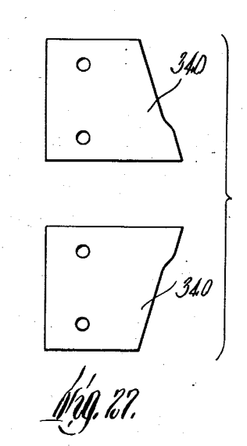
Figure 27 is a plan view of a pair of cam elements for controlling the truing devices to true a grinding wheel to the contour shown in Figure 28.

The axial motions of the rock shafts 320 are controlled by a pair of edge cams 340. As shown in Figures 23 and 27, these edge cams are formed as plates which may be secured, as by a pair of screws for each at 341, to a supporting block 342. Each of these blocks may have a dovetail sliding connection with a supporting yoke 345 and the axial position of the blocks 342 with respect to opposite arms of this yoke support may be adjusted, as by means of the oppositely disposed micrometer screws 346. The yoke support 345 is fixed in position to the casing. Cooperating with the cam faces of the cam plates 340 are the adjustable cam followers 350. Each of these followers is mounted at the outer end of a lever 351 which is fulcrumed as by the pin 352 to a block 353 secured to one of the rock shafts such as 320. As shown the block 353 is positioned between a collar 354 pinned to the rock shaft 320 and a spacing sleeve 355 which abuts at its forward end against a head 356 of the rock shaft, this sleeve 355 being keyed to the rock shaft and rocking in a bearing bushing 357 in the forward wall 358 of the main casing.

Figure 28:
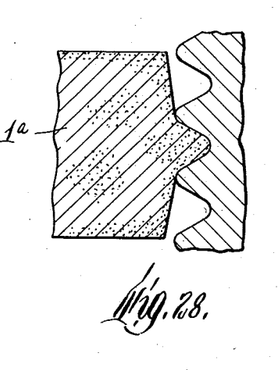
Figure 28 is a detail section showing the contour of wheel and work produced when the cams of Figure 27 are used.
Figure 29:
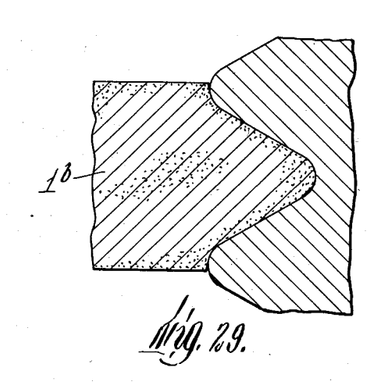
Figure 29 is a view similar to Figure 28, but showing the wheel and work contours produced by employing came shown in Figure 20.
Figure 30:
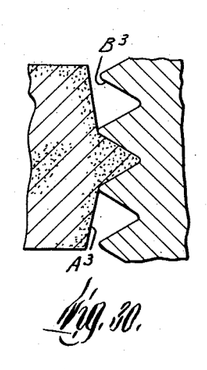
Figures 30 to 32 are views similar to Figures 28 and 29, but showing other possible contours which can be produced by using suitably shaped controlling cams.
Figure 31:
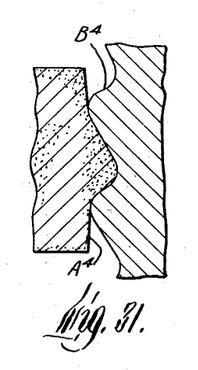
Figure 32:
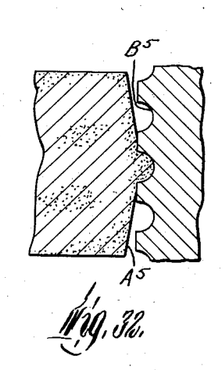

The collar 354 and the block 353 are held for simultaneous rocking motion, as by means of a pin 359 in the collar 354, which extends into a recess 360 in the block 353. A short arm 365 of the lever 351 is shown as provided with a bearing roll 366 which engages the end of a hardened abutment pin 367 carried by the casing wall 358. With this arrangement the roll 366 is held against the abutment pin 367 and the follower 350 is held against the edge of the cam plate 340 by the corresponding spring 322 so that as the rock shaft is rocked and the follower 350 passes along the cam edge of the corresponding cam plate, the axial position of the truing-device-carrying-rockshaft is determined by the cam contour. Various types of wheel contour may be accurately produced by employing correspondingly shaped controlling cams. For example, with the cam plates 340, shown in Figure 27, a wheel contour with a corresponding shape of threads in the work may be produced as shown in Figure 28, the wheel being indicated at 1a. In Figure 29 the contour of the wheel 1b is that determined by the cam contour shown in Figure 20. By employing cams of other suitable shapes, wheel and work contours $A_3$, $A_4$, $A_5$ and $B_3$, $B_4$, $B_5$, respectively as illustrated in Figures 30, 31 and 32, for example, may be made. Figure 31 illustrates the fact that by employing different shaped cams for the two truing device rock shafts, unsymmetrical contours may be produced, the control of the axial position of each of the rock shafts which carries the truing diamond being quite independent of the control for the other.

In Figures 21 and 22, also, a desirable mounting for the truing diamond on its carrying shaft is illustrated. The head 356 of this shaft, as shown in Figure 22, may be provided at its outer end with a transverse wedge shaped groove 370 and engaging in this groove may be a complementally shaped part 371 of the block 372. This block 372 may be fixed in position in engagement with the groove in the rock shaft head 356, as by a screw 373 passing therethrough and threaded into the rock shaft at the base of the groove 370. This block 372, as shown in Figure 21, is provided with a hole 375 to receive the diamond truing element 376 which may have threaded engagement at its rear end, as at 377, with the block. It may be fixed in axially adjusted position in the block, as by means of the set screw 378.

This application is a continuation in part of my application Serial No. 46,756, filed October 25, 1935, for Grinding machine.

From the foregoing description of certain embodiments of this invention, it should be evident to those skilled in the art that various other changes and modifications may be made without departing from the spirit or scope of this invention as defined by the appended claims.

I claim:

1. Mechanism for truing a wheel comprising a rock arm, means supporting said arm to rock on an axis substantially perpendicular to the face of said wheel to be trued, a wheel truing device carried by said arm, means for rocking said arm, and means acting during the rocking of said arm to move said arm lengthwise of its rocking axis.

2. A wheel truing mechanism comprising a rockable and axially movable shaft, an arm on said shaft, a wheel truing device on said arm, means for rocking said arm to thereby cause said device to traverse a grinding wheel face, and means actuable to move said shaft axially to bring said device out of contact with said wheel for one direction of rocking of said shaft.

3. A wheel truing mechanism comprising a plurality of rockable and axially movable shafts, an arm on each shaft, a wheel-truing device carried by each arm, a lever rockable with each shaft, a rocking actuating cam cooperating with said lever, and means for rocking said cam.

4. A wheel truing mechanism comprising a plurality of rockable and axially movable shafts, an arm on each shaft, a wheel-truing device carried by each arm, a lever rockable with each shaft, a rocking actuating cam cooperating with said lever, means acting near the limit of rocking of said shafts in opposite directions to move said shafts axially in one and then in the opposite direction to move said devices into and out of operative relation to said wheel.

5. A wheel truing mechanism comprising a plurality of rockable and axially movable shafts, an arm on each shaft, a wheel-truing device carried by each arm, a lever rockable with each shaft, a rocking cam cooperating with said lever, means for rocking said cam, and adjustable means cooperating with said lever during its rocking motion to control the operative axial positions of said shafts whereby adjustment of angular relation of the trued faces of the grinding wheel may be effected.

6. A wheel truing mechanism comprising a plurality of rockable and axially movable shafts, an arm on each shaft, a wheel-truing device carried by each arm, a lever rockable with each shaft, a rocking cam cooperating with said lever, means for rocking said cam, an angularly adjustable cam plate, a follower on said lever riding on said cam plate to thereby determine the axial position of said shaft during operative traverse of said device on said wheel, and spring means for holding said follower against said plate.

7. Wheel truing mechanism comprising a plurality of truing devices, means for traversing said devices across angularly related faces of the grinding wheel in arcuate paths substantially parallel with the respective faces, and means adjustable to produce motion of said devices axially of said arcuate paths while said devices are in contact with the wheel to vary the effective paths of said devices and thereby the angular relationship of the trued faces of said wheel.

8. A wheel truing mechanism comprising a plurality of rockable and axially movable shafts, an arm on each shaft, a wheel truing device carried by each arm, a lever rockable with each shaft, a rocking cam cooperating with said lever, means for rocking said cam, an angularly adjustable cam plate, a follower on said lever riding on said cam plate to thereby determine the axial position of said shaft during operative traverse of said device on said wheel, spring means for holding said follower against said plate, and means holding said follower out of contact with said plate during the return direction of traverse to hold said device out of operative relation to said wheel.

9. A wheel truing mechanism comprising a truing tool, means including driving connections provided with an interposed slip clutch for traversing said tool across a wheel face, and means for positively stopping the stroke of said tool at a predetermined point whereupon said slip clutch may become effective.

10. A wheel truing mechanism, comprising a rock shaft, an arm, a truing device carried by said arm, a gear segment carried by said shaft, a rack bar having teeth meshing with the teeth of said segment, means for moving said rack bar to rock said shaft, and means for moving said shaft axially as it is being rocked.

11. In a wheel truing mechanism for a wheel having angular related grinding faces, a pair of rock shafts arranged substantially perpendicular to said faces, an arm carried by each rock shaft, a truing device carried by each arm, means for rocking such shafts comprising a pair of rack bars arranged in substantially parallel relation and each at an angle to its respective shaft, the teeth of each rack bar being arranged at an angle thereto, segments carried by each rock shaft meshing with the teeth of its bar, a cam, operative connections from said cam for moving said rack bars axially, and means for actuating said cam.

12. A wheel truing mechanism, comprising a pair of rock shafts, an arm carried by each rock shaft, a truing tool carried by each arm, an actuating arm carried by each shaft, a rock member, operative connections between said rock member and arms, means for rocking said rock member, and means for moving said shafts axially while they are being rocked.

13. A wheel truing mechanism, comprising a rock shaft, an arm carried by said rock shaft, a truing tool carried by said arm eccentric to said shaft, means for rocking said shaft, a lever fulcrumed to said shaft transverse to its axis, and means engaging said lever and acting to move said shaft axially as it is being rocked.

14. A wheel truing mechanism, comprising a rock shaft, an arm carried by said rock shaft, a truing tool carried by said arm eccentric to said shaft, means for rocking said shaft, a spring tending to hold said shaft in one axial position, an arm carried by said shaft to swing through an arc as said shaft is rocked, and a cam with which said arm engages and against which said arm is pressed by said spring for moving said shaft axially against the pressure of said spring during the desired rocking motion of said shaft.

15. A wheel truing mechanism, comprising a rock shaft mounted for rocking and axial motion, a truing tool eccentrically carried by said rock shaft, an arm carried by said rock shaft, a rocker member, one of said members having a slot and the other of said members having a roller engaging in said slot, said roller and slot connection permitting axial motion of said shaft while said rocker member is axially fixed, means for rocking said rocker member to rock said shaft, and means for controlling the axial position of said shaft while it is being rocked.

16. A wheel truing mechanism, comprising a rock shaft mounted for rocking and axial motion, a truing tool eccentrically carried by said shaft, means for rocking said shaft, a lever fulcrumed transversely of said shaft axis to be swung transversely of its fulcrum as said shaft is rocked, an abutment against which one end of said lever engages during such rocking motion of said shaft, a cam member against which the other end of said lever operatively engages, and means for yieldingly holding said shaft in the axial position for said lever to engage both said abutment and said cam, whereby the contour of said cam determines the axial position of said shaft as said shaft is being rocked.

17. A wheel truing mechanism comprising a rock shaft mounted for rocking and axial motion, a truing tool eccentrically carried by said rock shaft, a rocker member mounted to rock on an axis non-parallel to the axis of said rock shaft, an arm mounted on said rock shaft, means for rocking said member, means for moving said shaft axially as it is rocked, and interengaging means between said rocker member and arm for rocking said shaft as said rocker member is rocked for all axial positions of said shaft.

RALPH E. FLANDERS.